Patented Jan. 10, 1950

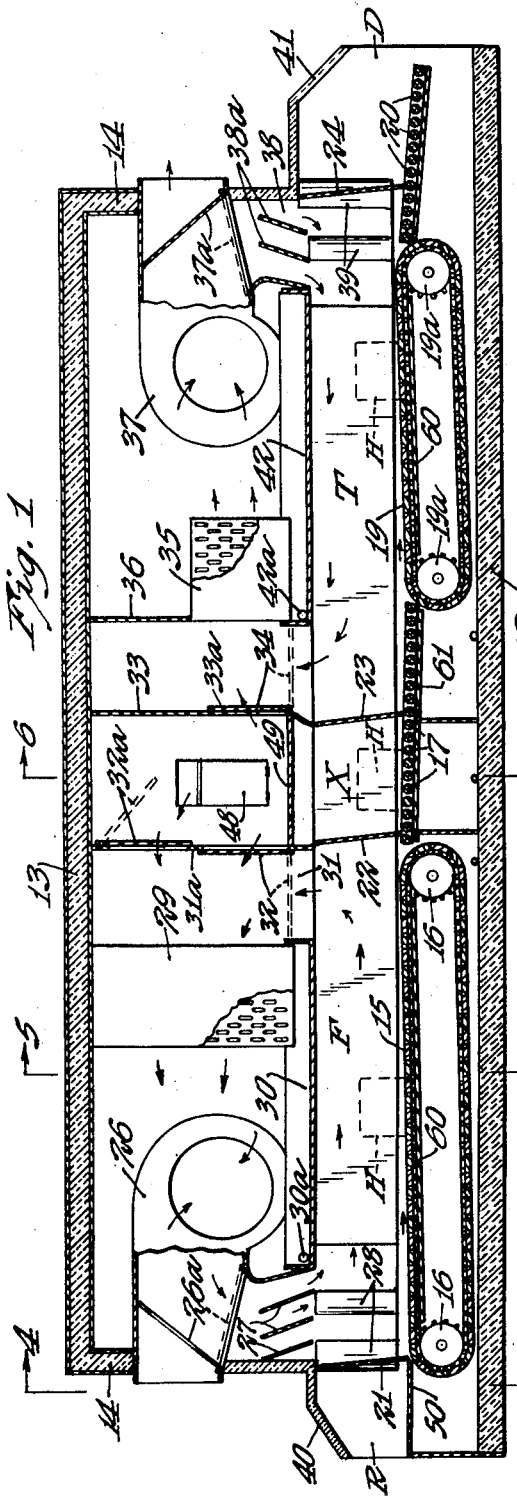

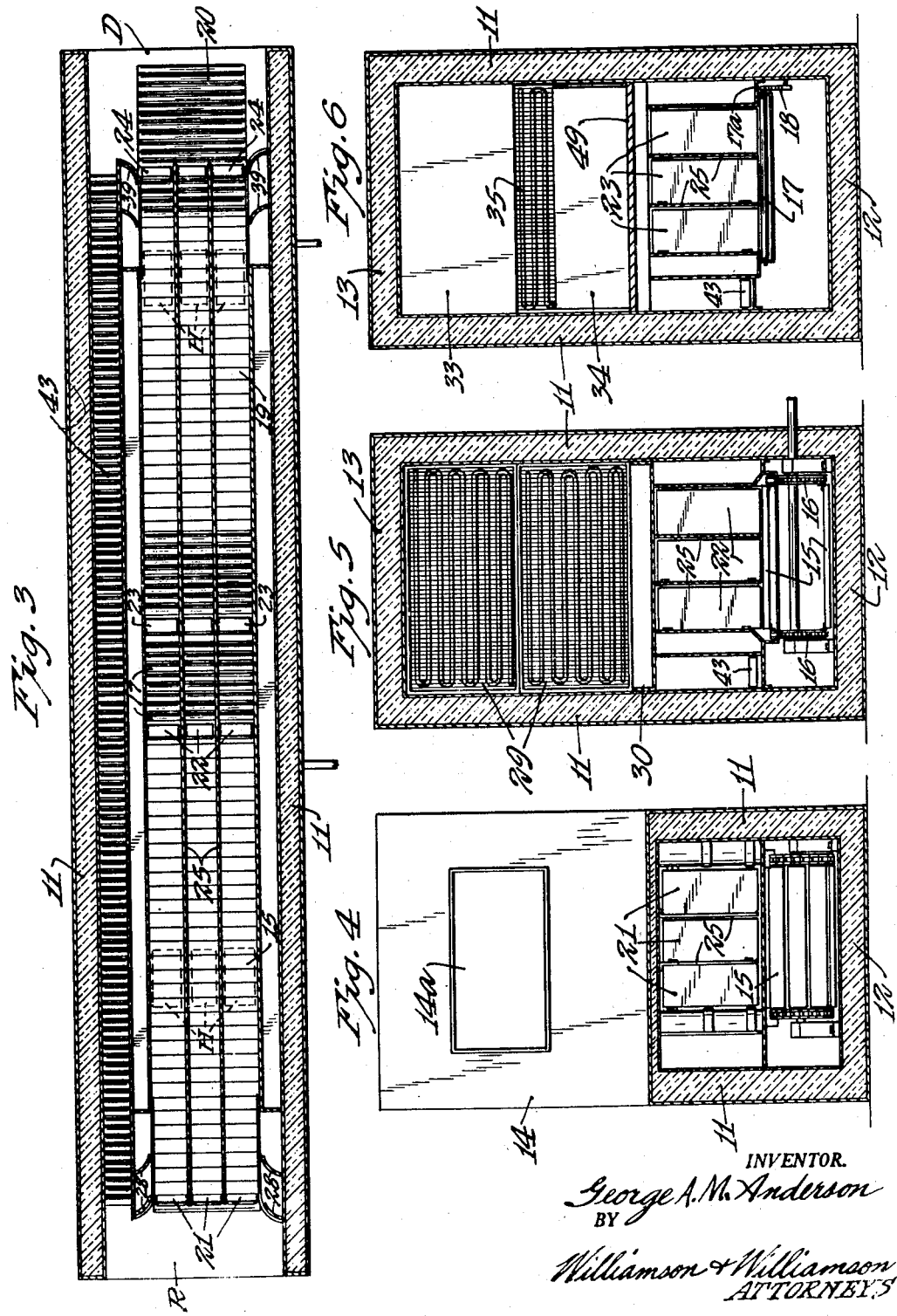

2,494,027

UNITED STATES PATENT OFFICE 2,494,027

MULTISTAGE METHOD AND APPARATUS
FOR FREEZING COMESTIBLES

George A. M. Anderson, Owatonna, Minn., assignor to The King Company, Owatonna, Minn., a corporation of Minnesota Application March 20, 1946, Serial No. 655,673

10 Claims. (Cl. 62—102)

This invention relates to a method and apparatus for handling and fast freezing food products and natural foods. The invention relates more specifically to a high capacity and commercially successful method and apparatus for accomplishing the said results.

It is an object of my invention to provide a highly efficient, multi-stage method of very quickly freezing comestibles in the continuous travel thereof through a freezing chamber, and to thereafter temper the fast frozen products to the predetermined temperature desired for convenient handling, slicing, etc.

A further object is the provision of high capacity, efficient apparatus for deep freezing foods and other products, applying heat-transferring and absorbing media in a highly efficient manner and operated at relatively low cost.

A further object is the provision of multistage deep freezing apparatus wherein a continuous freezing tunnel is utilized with novel partitions in said tunnel to form a first stage chamber for very rapidly freezing the articles at a very low temperature; to form a second stage refrigeration chamber wherein the articles in their travel through the tunnel are tempered to a predetermined temperature most desirable to facilitate handling or slicing; and preferably but not necessarily, to form a transition chamber between said two first mentioned chambers whereby the circulatory heat-absorbing means may be most efficiently and economically applied in the two treating chambers.

Another object is the provision in multistage apparatus of the type described, of swingable transverse partitioning or closure means for defining the said treating chambers, opened successively and intermittently by the travel of the successively disposed articles upon conveyor means disposed at the bottom of the tunnel.

A still further object is the provision, in apparatus of the type described, of longitudinal, removable and interchangeable partitions positioned in said tunnel to define a series of longitudinal conditioning lanes whereby through various selective arrangement of said longitudinal partitions the number of lanes may be varied and also the widths thereof to accommodate articles or article holders of various dimensions.

It is a still further object to provide a method and apparatus of the type described having efficient and improved facilities for advantageously applying and recirculating in each of the main treatment chambers chilled air and for also readily defrosting the coils and other parts of the refrigerating units.

These and other objects and advantages of the invention will more fully appear from the following description, made in connection with the accompanying drawings, wherein, like reference characters refer to similar parts throughout the various views, and, in which:

Figure 1 is a vertical section taken longitudinally through an embodiment of my apparatus;

Figure 2 is a somewhat diagrammatic, horizontal section taken longitudinally through the top of my apparatus just above the refrigeration unit;

Figure 3 is a horizontal section taken through the freezing tunnel of my apparatus;

Figure 4 is a cross section taken on the line 4—4 of Figure 1 showing the receiving end of my apparatus in end elevation;

Figure 5 is a vertical cross section taken on the line 5—5 of Figure 1;

Figure 6 is a vertical cross section taken through the transition chamber on the line 6—6 of Figure 1;

Figure 7 is a detailed cross section showing the bottom of the tunnel and a suitable medium for supporting one of the conveyors thereon;

Figure 8 is a detailed cross section showing the mounting and structure of the intermediate conveyor in the transition chamber of the form illustrated.

The embodiment of my apparatus illustrated, includes an elongated, horizontal heat-absorbing tunnel, having a receiving end R and a delivery end D and partitioned vertically, as will be later more fully described, to define a fast freezing chamber F, a transition chamber X and a tempering chamber T. The tunnel is formed by a heavily insulated elongated casing having side walls 11, a bottom or insulated floor 12 and a ceiling wall 13. The casing is also provided with heavily insulated ends 14 which extend from the top of the casing downwardly to the top of the tunnel proper through which products travel. In the form shown, the insulated casing is extended well above the tunnel proper to house and accommodate the blowers and refrigeration coils or heat exchangers, constituting parts of my improved system although it will of course, be understood that these units may be separately housed and connected by suitable ducts with the interior of the tunnel proper.

The elongated, horizontal tunnel is provided with continuously operating conveying means for receiving the articles to be frozen (usually, but not necessarily disposed in foraminous article holders H) at the entrance R of the tunnel and for supporting and conveying said articles slowly through the three chambers F, X and T, without interruption. To this end, in the form shown, a horizontally disposed endless conveyor 15 of the transverse slat type is trained about two sets of chain sprockets 16 and is mounted just above the insulated floor 12 extending from the receiving end of the tunnel to the forward end of the transition chamber X. This conveyor is suitably driven by an electric motor or other power source connected with the shaft of the delivery end sprockets 16 through a suitable variable speed transmission mechanism. Conveying of the article holders or products is continued through the transition chamber by, as shown, a series of transversely spaced conveyor rollers 17 which receive from the delivery end of endless conveyor 15 and convey the products or article holders through the transition chamber X and into the forward portion of the tempering chamber T. Conveyor rollers 17 are driven by a suitable means such as an endless driving chain 18 trained about driven sprockets 17a one of which is affixed to each of the roller shafts, said sprockets being aligned longitudinally of the casing at one side thereof, as shown in Fig. 8. A second slat-type endless conveyor 19 is mounted at the bottom of tempering chamber T, receiving from the delivery end of the series of conveyor rollers 17 and delivering to a declined series of delivery rollers 20 which extend as shown, from within the tempering chamber to the delivery end D of the tunnel. Conveyor 19 is trained about two sets of chain sprockets 19a, the outermost set of which is driven by a suitable rotary power source which may be common to the driving of the freezing chamber conveyor 15.

To define the three chambers F, X and T of my tunnel, I provide, as shown, four series of partition means in the form of a plurality of swingable doors, corresponding in number for each series to the number of longitudinal lanes desired for the treatment of articles such as comestibles. Thus, the receiving end of the tunnel, as shown, is provided with a series of three inwardly swinging doors 21 disposed in side by side relation and having trunnions or hinge elements positioned slightly out of line with the vertical and inclined, forwardly therefrom to assure closing of said doors by gravity when opening pressure is released. The two end doors of the series 21 are hinged along their outside longitudinal edges and cooperate with the central door 21 to form a closure for the receiving end of the fast freezing chamber F. A similar series of three doors 22 is disposed at the inner end of the fast freezing chamber F mounted for swinging on axes inclined forwardly, slightly to the vertical and cooperating when closed, to define a partition between the fast freezing chamber F and the transition chamber X. A third series of similar doors 23 is provided between the transition chamber X and the receiving end of the tempering chamber T, said doors corresponding in number to series 21 and 22 and having their hinged axes inclined forwardly somewhat from the vertical to insure closure thereof by gravity, as in the case of doors 21 and 22. A fourth series of doors 24 is provided at the delivery end of the elongated, horizontal tunnel being mounted pivotally for closure by gravity as in the case of the other doors and corresponding in number and longitudinal alignment with doors 21 to 23 inclusive, and when closed, constituting a closure partition for the delivery end of the tunnel. All of the said doors 21 to 24 inclusive, are swingable in the direction of travel of the articles treated, i. e. in the direction of movement of the conveyor means and in the form shown, said doors are opened by abutment of the article holders or articles themselves in their travel longitudinally through the tunnel.

I prefer to provide a plurality of removable, longitudinally extending vertical lane-defining partitions 25 which are disposed in longitudinal alignment with the longitudinal edges of the several series of doors, dividing the space of the entire tunnel and the three chambers F, X and T thereof longitudinally into three lanes through which products or article carriers may travel. The several partitions 25 are preferably removably supported from their upper longitudinal edges and may be formed in sections for installation and detachment and preferably, have narrow, out-turned attachment flanges which may slidably fit offset horizontal flanges of longitudinal retaining strips secured to the ceiling portion of the tunnel proper.

Above the fast freezing chamber F and above the tempering chamber T are mounted, within the upper portion of the insulated casing, power air circulating and heat exchanging units for servicing the respective chambers. Thus, above freezing chamber F, a large air circulating blower 26 is mounted with its rotor shaft disposed transversely and horizontally of the casing and with preferably, intake passages at both sides of the casing and disposed medially of the length of the freezing chamber F. The discharge of the casing of blower 26 is forwardly and a hinged closure or baffle 26a is provided in the discharge duct adapted to be swung to vertical position closing off discharge through a large rectangular aperture 14a in the receiving end wall of the casing or to be positioned, as shown, in dotted lines in Fig. 1, to discharge air exteriorly of the casing and to close communication of discharge with the forward end of freezing chamber F. In operation of my apparatus, the hinged closure 26a is positioned vertically and air drawn from the space rearwardly of the blower casing is directed forwardly and downwardly, being guided between a series of horizontally spaced, transverse directing vanes 27 which are declined rearwardly from their upper to their lower edges. To further guide the air discharged from blower 26, I provide in the vertical side portions of the tunnel adjacent the receiving entrance thereof, a series of vertically disposed inwardly and somewhat rearwardly bent deflector plates 28 which assist in delivering the discharged air in a somewhat rearwardly deflected relation to the entrance portion of the freezing chamber F.

Above the rear end of fast freezing chamber F and extending transversely of the upper space within the longitudinal casing of the apparatus, I provide an enlarged heat exchanger in the form of as shown, a refrigeration coil 29, the core of which traverses substantially the cross sectional area within the top portion of the casing and is disposed some distance inwardly or rearwardly of the blower 26. This coil is suitably connected with a source of very cold refrigerant and is adapted to absorb heat from the air drawn therethrough from freezing chamber F by operation of blower 26. Below coil 29 and below the rear portion of blower 26, a liquid collection pan 30 is horizontally mounted, secured to suitable horizontal stringers or other members of the frame work of my apparatus and having a laterally extending drain pipe 30a communicating therewith at the lower end thereof for drainage of collected moisture to the outside of the apparatus. The bottom of pan 30 may conveniently constitute a ceiling for the intermediate portion of the freezing chamber F being spaced from the receiving end wall 14 of the casing to define the air discharge passage into the freezing chamber and being spaced at its rear end forwardly of the partitioning defining the forward end of transition chamber X to define an air return passage 31 communicating with the rear or air receiving end of the coil 29. A vertical partition 31a is substantially vertically aligned with the series of doors 22 closing off communication when its doors are closed, with the air space behind coil 29. A hinged closure and baffle 32 is hinged at its rear longitudinal edge on a horizontal axis and is adapted to be positioned vertically as shown in Fig. 1, opening communication between freezing chamber F and the air circulating space just rearwardly of the coil 29. Baffle 32 may be positioned horizontally, as shown in the dotted lines, to close off recirculation of air from freezing chamber F to the treating coil 29.

The space above transition chamber X, directly above the series of transverse doors 23, is transversely divided by a vertical partition 33, said partition having a doorway 33a in the lower portion thereof communicating with the space above the transition chamber. A hinged closure or baffle 34 is associated with said doorway, being adapted to be disposed in vertical position as shown in full lines in Fig. 1 or in horizontal (dotted line position), whereby communication is closed, either between the space above transition chamber X or the space above the inner end of tempering chamber T with the inner and air-receiving end of a refrigeration coil 35 mounted above the tempering chamber T, adjacent the inner end thereof. A vertical partition 36 extends from the top of coil 35 to the top of the enlarged casing, preventing flow of air above the coil rearwardly of the casing. A second, enlarged blower 37 is positioned above the rearward or outer portion of the tempering chamber T suitably supported in the upper portion of the casing and having its rotor mounted on a transverse and horizontally disposed axis with preferably intake openings at the opposite sides of the blower casing. Blower 37 like the blower for the fast freezing chamber, has the discharge portion of its casing directed longitudinally of the apparatus and extending through the discharge end of the casing for discharge when desired, to the exterior thereof. The discharge duct of blower 37 is provided with a shiftable closure of baffle plate 37a hinged along its forward horizontal edge and adapted to be positioned to direct all discharge of air downwardly to the outer end of the tempering chamber or to be shifted to substantially horizontal position, closing off communication with the tempering chamber and directing discharge of all air outwardly through the opening in the delivery end of the top of the casing. A series of transversely disposed, spaced deflecting wings 38a are mounted in the communication passage between the discharge of blower 37 and the outer end of tempering chamber T, inclined to direct the discharged, chilled air downwardly and longitudinally inwardly of said chamber. In the sides of the tunnel, adjacent the defined lanes, a series of substantially vertical, inwardly curved baffle plates 39 are mounted, similar to the baffles 28 in the freezing chamber for directing recirculated or discharged air inwardly, longitudinally of the tempering chamber. The receiving end and delivery end of the tunnel are provided with insulated cowls 40 and 41 respectively, to restrict refrigerant losses during opening of the door series 21 and 24 respectively, in the operation of my apparatus. An elongated drip pan 42 underlies coil 35 and the blower casing 37 and the bottom thereof, as shown, constitutes a ceiling for the tempering chamber T, extending from a point in vertical alignment with the partition 36 above the rear and receiving end of the coil to the discharge passage numbered 38 connecting the blower with the outer end of tempering passage T.

In the apparatus illustrated, I provide within the bottom of the housing or casing, and at one side of the freezing tunnel, a longitudinally extending, return conveyor 43 which may comprise a series of freely journaled rollers declined in arrangement from the delivery end of the tunnel to the forward end thereof, for conveying empty article holders after the comestibles or goods are removed therefrom to the receiving end of the tunnel.

To properly position and support the upper leaves of the endless conveyors 15 and 19 in chambers F and T, the outer ends of the slats thereof, may be provided with offset rollers 44 (see Fig. 7) which ride upon angle tracks 45 secured horizontally to the frame work at the sides of the tunnel proper, and form part of the endless chains of the conveyors.

In Fig. 2, I somewhat diagrammatically illustrate suitable power sources for operating the various parts of my apparatus. To this end, electric motors M—1 and M—2 are mounted exteriorly of the enlarged casing, disposed axially of the rotors of blowers 26 and 37 respectively and drivably connected with the respective rotor shafts. These motors are preferably equipped for operation at a plurality of speeds. Conveyor 15 is driven by an electric motor M3 mounted at one side of the casing and drivably connected through a variable speed transmission mechanism 46 with the rear conveyor shaft. The rollers 17 of the intermediate roller may also be driven from an electric motor M3 through suitable means such as an endless chain 18, the upper leaf of which is trained about the pinion 17a of the several conveyor rollers, this chain being driven from a sprocket (not shown) which is in turn, driven from the rear shaft of conveyor 15. It will of course, be understood that a separate motor and transmission mechanism may be provided for driving the roller conveyor 17.

The endless slat conveyor 19 may be driven by an electric motor M—4, also mounted at one side of the insulated casing and drivably connected with a variable speed transmission mechanism 47, the power take-off element of which is connected for driving the delivery end sprocket shafts of the conveyor 19.

A warm air entrance door 48 is provided, as shown, through one of the longitudinal sides of the casing, communicating with the space above transition chamber X and positioned as shown, centrally above the closure ceiling plate 49 of the transition chamber.

*Operation*

It will be noted that the refrigeration coil 29 associated with the freezing chamber F, is of much greater capacity than the coil 35 for chilling the air recirculated through the tempering chamber. Both coils are connected with a refrigerator system whereby a very cold fluid refrigerant is circulated through the coils.

With the hinged blower discharge baffles 26a and 37a, positioned as shown in full lines in Fig. 1, and with the hinged doors or baffles 32, 32a and 34 also positioned as illustrated in full lines, the several motors M—1 to M—4 inclusive, may be started to drive the blowers and the conveyor means for operation. Articles to be treated, usually disposed in foraminous article holders H or in receptacles, are pushed across the receiving deck 50 at the receiving end of the tunnel and may be fed into the three or more lanes of the tunnel, the doors 21 being pushed open by the article holders or in the case of heavy food products such as meat, by the articles themselves. The articles thus enter the fast freezing compartment F and travel slowly, longitudinally therethrough being subjected to the recirculated, very cold air which it will be observed, travels in the same direction as the articles to be frozen. In the freezing chamber F, air is rapidly recirculated through the refrigerating coil 29 into the two intakes at the side of the blower casing 26 and through the discharge of the blower, downwardly and into the entrance of the freezing chamber. In this connection, it will be noted that the conditioning air is directed inwardly by the declined, deflector plates 27 and by the upstanding, curved baffles 28, so that only a minimum amount of cold air escapes at the entrance of the tunnel as the first set of doors 21 open for passage of the article holder. The cold air is directed both downwardly and laterally and rearwardly through the lanes defined by the longitudinal, vertical partitions 25 in the tunnel, the greater part of the air discharged through the blower, being recirculated by passage through the communication passage 25 into the coil 29.

The transition chamber X forms an air lock between the fast freezing chamber F and the tempering chamber T and is chilled and maintained at an intermediate temperature by leakage and passage of air from chambers F and T therein during the opening and closing of the two sets of doors 22 and 23. In this connection, it will be noted that with the article holders properly spaced upon the conveyors, the two sets of doors 22 and 23 will never be simultaneously open, but one set will be closed while the other set is open, by progression of the article holders through the tunnel.

The speed of the freezing chamber conveyor 15 is properly controlled through regulation of the variable speed transmission mechanism 47, in relation to the temperature and speed of circulation of the cold air delivered to cause the articles to be very rapidly frozen to the desired temperature in their travel through the fast freezing compartment.

The frozen articles, usually in holders H, entering the tempering chamber T, travel therethrough with the tempering air circulated in this chamber in a direction opposite to travel of the articles. In this connection, it will be seen (see Fig. 1) that the tempering blower 37 discharges at the delivery end of tempering chamber T, the air discharged being guided downwardly and inwardly, longitudinally of chamber T and passing longitudinally of chamber T to the receiving end thereof, whereby it is drawn upwardly and recirculated through the tempering coil 35. The speed of blower 37 may be varied if desired, as a factor in controlling the tempering chamber, of articles treated and the speed of the tempering chamber conveyor may also be independently regulated within limits, if desired, as a factor in controlling tempering to the temperature desired. The purpose of the tempering chamber of course, is to quite accurately control the temperature of the articles as they are delivered from the tunnel, in accordance with the particular requirements for handling, slicing, etc.

The article holders or articles, in the last portion of their travel, open the last series of doors 24 and pass on to the delivery rollers 20 where an attendant may remove the same from my apparatus and if desirable, may take the articles out of the holders and place the empty holders on the return conveyor 43 for delivery to the receiving end of the tunnel.

The problem of defrosting refrigerator coils in apparatus of the type described, is an important one and with my apparatus, is very efficiently provided for by the system as illustrated. When it is desired to defrost coils 29 and 35, the baffle plates 26a and 37a of the two blowers are swung downwardly to the dotted line positions indicated in Fig. 1, thereby causing the blowers to discharge into the atmosphere outside of the insulated housing. The air intake baffles 32 and 34 are also closed by swinging to the dotted line positions of Fig. 1 as is the upper hinged door 32a in the vertical partition above the tempering chamber. Warm air inlet door 48 may then be opened to admit air from outside of the casing. With the doors and baffles positioned as described, blowers 26 and 37 in operation, draw warm air through the coils 29 and 35, thereby very rapidly defrosting these coils without circulation of the warm air through the conditioning chambers F, X and T. All water melted from the coils and blower casings, as well as the side walls of the casing above the treating chambers, is collected in the pans or troughs 30 and 42 and is drained through the transversely extending pipes 30a and 42a and so removed from my apparatus. Defrosting is thus very rapidly accomplished with a minimum temperature effect upon the stagnant air in the treating chambers F, X and T.

While the embodiment of my apparatus illustrated shows a tunnel longitudinally and vertically divided by partitions into three lanes, it will of course, be understood that a greater or lesser number of lanes may be defined and that a door of each series may be provided for each of the lanes or one door may provide for accommodation of articles simultaneously in two or more lanes. It will further be seen that by removing the longitudinal, vertical partitions, between a pair of the lanes where free edges of two doors of each series abut, that a lane may be materially widened for accommodation of very large articles or article holders.

With my method and apparatus, it will be noted that the circulation of air through the freezing and tempering chambers F and T is inwardly and oppositely, thereby holding infiltration of outside air and also cold air losses to a minimum in the operation. The transition chamber, with its series of doors 22 and 23 constitutes a very effective air lock minimizing communication of circulated air between the two treatment chambers during travel of articles.

With my method and structure, the refrigeration coils and blowers may be defrosted without circulating air through the treating chambers and in large installations without entirely stopping the operation of the freezing treatment.

From the foregoing description, it will be seen that I have provided a multi-stage method and apparatus of very quickly freezing comestibles in the continuous travel thereof, adapted to be operated with efficiency and at low maintenance cost.

It will of course, be understood that various changes may be made in the form, details and arrangement of parts of my apparatus, without departing from the scope of my invention.

What I claim is:

1. In freezing apparatus, an elongated tunnel having an entrance and a delivery, at least three sets of closures dividing said tunnel into a pair of adjacent conditioning chambers, means for maintaining said chambers at different freezing temperatures, conveying means in said tunnel for transporting articles from the receiving end to the delivery end thereof, means for normally maintaining said closure means in closed positions, said closure means in each instance being arranged to be momentarily opened by travel of articles into contact therewith, and an air chilling and recirculating system having a discharge of chilled air at the entrance of said tunnel directed inwardly of said tunnel and another discharge of chilled air at the delivery of said tunnel directed inwardly and means associated with said system for withdrawing the circulated air from zones in said tunnel at the inner ends of said adjacent conditioning chamber.

2. In freezing apparatus, an elongated, continuous tunnel having an entrance and a delivery, closure means in the entrance, in the delivery and in the medial portion of said tunnel for dividing said tunnel into a pair of spaced conditioning chambers and an intermediate air lock chamber, means for maintaining said conditioning chambers at different freezing temperatures, conveying means in said tunnel for transporting articles from the receiving end to the delivery end thereof, yieldable means for normally maintaining said closure means in closed positions, said closure means in each instance being arranged to be momentarily opened by travel of articles into contact therewith said temperature-maintaining means comprising two air chilling and recirculating systems one having a chilled air discharge adjacent the entrance of said tunnel, directed inwardly longitudinally of said tunnel and having an air withdrawal passage at the inner end of the said first conditioning chamber and the second of said systems having a chilled air discharge adjacent the delivery end of said tunnel directed longitudinally and inwardly of said tunnel and having an air withdrawal passage at the inner end of the second conditioning chamber of said tunnel.

3. Fast freezing apparatus having in combination a substantially horizontal tunnel having an entrance at one end and an exit at the opposite end, conveyor means mounted at the bottom of said tunnel for transporting articles therethrough, vertically disposed, longitudinal partition means dividing said tunnel into a plurality of longitudinal article-treating lanes, said partition means being removable to vary selectively, the width and number of lanes defined, a series of doors at the entrance of said tunnel and a series of doors at the exit of said tunnel, the doors of each of said series being disposed in side-by-side relationship and corresponding in number to the maximum number of lanes defined, means for normally maintaining said doors in closed position, said closure means in each instance being arranged to be momentarily opened by travel of articles into contact therewith and means for circulating chilled air in said tunnel said means including a discharge of chilled air at each end of said tunnel inwardly of said entrance and exit doors and in each instance, directed inwardly towards the medial portion of said tunnel and withdrawal air passages at the medial portions of said tunnel.

4. Fast freezing apparatus having in combination a housing defining in one longitudinal portion thereof, a freezing chamber having an entrance and an exit and defining in another longitudinal portion thereof, a chamber for air circulating and chilling mechanism, means for progressing articles to be frozen through said freezing chamber, a blower mounted in said second chamber, a refrigerator coil also mounted in said second chamber and related to said blower to condition air passing through said second chamber, discharge means for directing chilled air from said second chamber to one end of said freezing chamber, intake means communicating the opposite end of said freezing chamber with said second chamber and means for closing communication between said first and second chambers and means for intaking air into said second chamber from without said housing and means for discharging air from said second chamber whereby said coil and said second chamber may be defrosted without affecting temperature of air in said freezing chamber.

5. The structure set forth in claim 4 and moisture collection means in the bottom of said second chamber and a drain therefrom extending to the outside of said housing.

6. The structure set forth in claim 4 and a drain pan at the bottom of said second chamber constituting at least in part the ceiling of said freezing chamber and adapted to collect defrosted moisture from said second chamber.

7. The steps in a continuous method of quick freezing which consist in progressing articles to be frozen through a continuous heat transfer zone, rapidly circulating chilled air from the end portions of said zone inwardly towards the medial portion of said zone and over and around the articles being progressed and thereby overcoming the effect of unchilled air upon said articles at the terminal portions of said zone and withdrawing the circulated air from the medial portions of said zone.

8. The steps in a continuous method of quick freezing which consist in progressing articles to be frozen in a continuous heat transfer zone, recirculating air in two opposite flow paths between and over said articles progressed, said flow paths extending from the terminal portions of said zone inwardly to the medial portion thereof and in said recirculation, refrigerating said air at points out of said heat transfer zone.

9. The method of continuous, multi-stage freezing which consists in passing articles to be frozen through a predetermined, continuous path of travel, refrigerating and recirculating air around and over said article in travel throughout the first portion of said path in a flow comprehending application of the refrigerated air at the start of said path of travel and withdrawal of such air at the medial portion of said path of travel and refrigeration and recirculation of air throughout the last portion of said path in a flow comprehending application of such refrigerated air at the end of said path of travel and withdrawal of such air at the medial portion of said path.

10. The combination of steps set forth in preceding claim 9, further characterized by withdrawing air in said two recirculating paths at zones spaced apart in the medial portion of the path of travel of said articles.

GEORGE A. M. ANDERSON.

REFERENCES CITED

The following references are of record in the file of this patent:

UNITED STATES PATENTS

| Number | Name | Date |
|---|---|---|
| 1,867,546 | Baer | July 19, 1932 |
| 1,958,890 | Foss et al. | May 15, 1934 |
| 1,969,833 | Beard | Aug. 14, 1934 |
| 2,124,268 | Williams | July 19, 1938 |
| 2,126,285 | Shaaf | Aug. 9, 1938 |
| 2,237,256 | Finnegan | Apr. 1, 1941 |
| 2,382,084 | Mathews | Aug. 14, 1945 |
| 2,402,921 | Sharpe | June 25, 1946 |

OTHER REFERENCES

Publication, "Frick Freezing Systems," Bulletin 147-A, copyright 1940 by Frick Co., Waynesboro, Pa. (Copy in Div. 44, 62/Ford Freezing, pages 2, 3, 4 and 5 relied on.)